(12) United States Patent
Serr et al.

(10) Patent No.: US 12,552,524 B2
(45) Date of Patent: Feb. 17, 2026

(54) METHOD AND DEVICE FOR CONTROLLING A THERMAL AND ELECTRICAL POWER PLANT FOR A ROTORCRAFT

(71) Applicant: AIRBUS HELICOPTERS, Marignane (FR)

(72) Inventors: Christophe Serr, Simiane-Collongue (FR); Olivier Honnorat, Aix en Provence (FR); Alexandre Madeira, Aix en Provence (FR); Jean-Christophe Coquillat, Riez (FR)

(73) Assignee: AIRBUS HELICOPTERS, Marignane (FR)

( * ) Notice: Subject to any disclaimer, the term of this patent is extended or adjusted under 35 U.S.C. 154(b) by 731 days.

(21) Appl. No.: 17/668,428

(22) Filed: Feb. 10, 2022

(65) Prior Publication Data

US 2023/0011896 A1   Jan. 12, 2023

(30) Foreign Application Priority Data

Feb. 22, 2021   (FR) ........................ 2101689

(51) Int. Cl.
*B64C 27/12* (2006.01)
*B64D 27/02* (2006.01)
(Continued)

(52) U.S. Cl.
CPC ............ *B64C 27/12* (2013.01); *B64D 27/026* (2024.01); *B64D 27/33* (2024.01); *B64D 31/09* (2024.01);
(Continued)

(58) Field of Classification Search
CPC ...... B64C 27/12; B64D 27/026; B64D 35/02; B64D 35/08; B64D 31/06; B64D 31/00; Y02T 50/60
See application file for complete search history.

(56) References Cited

U.S. PATENT DOCUMENTS

| | | | | |
|---|---|---|---|---|
| 3,590,636 A | * | 7/1971 | Eddy, Jr. ................ | B64D 43/00 73/178 H |
| 2013/0199198 A1 | * | 8/2013 | Corpron .................. | B64C 27/04 60/773 |

(Continued)

FOREIGN PATENT DOCUMENTS

| | | | | |
|---|---|---|---|---|
| CN | 108082499 A | * | 5/2018 | ............. B64D 27/02 |
| FR | 2994687 A1 | | 2/2014 | |
| FR | 3090576 A1 | | 6/2020 | |

OTHER PUBLICATIONS

EPO machine translation of Cui et al. reference CN108082499A (Year: 2018).*

(Continued)

*Primary Examiner* — Navid Z. Mehdizadeh
*Assistant Examiner* — Shelley Marie Osterhout
(74) *Attorney, Agent, or Firm* — BROOKS KUSHMAN P.C.

(57) ABSTRACT

A method for controlling a thermal and electrical power plant for setting in motion at least one rotary member of a rotorcraft, the power plant comprising at least one heat engine and an electrical system provided with at least one electric machine. The method comprises: selecting, with a selector, an operating mode chosen from several operating modes; determining a density altitude and comparing, with a controller, the current density altitude and a threshold density altitude; and controlling, with the controller, the at least one electric machine depending on at least the chosen (Continued)

operating mode as well as the comparison and a necessary power to be supplied to the power transmission system.

20 Claims, 7 Drawing Sheets

(51) Int. Cl.
  *B64D 27/33* (2024.01)
  *B64D 31/09* (2024.01)
  *B64D 31/18* (2024.01)
  *B64D 35/02* (2024.01)
  *B64D 35/023* (2025.01)
  *B64D 35/08* (2025.01)
(52) U.S. Cl.
  CPC ............. *B64D 31/18* (2024.01); *B64D 35/02* (2013.01); *B64D 35/023* (2024.01); *B64D 35/08* (2013.01)

(56) References Cited

U.S. PATENT DOCUMENTS

| | | | |
|---|---|---|---|
| 2014/0054411 A1 | 2/2014 | Connaulte et al. | |
| 2014/0117148 A1* | 5/2014 | Dyrla | B64D 27/24 244/17.13 |
| 2015/0084565 A1* | 3/2015 | Le Peuvedic | H02P 29/02 318/434 |
| 2019/0291852 A1* | 9/2019 | Atamanov | B64D 35/08 |
| 2019/0322382 A1* | 10/2019 | Mackin | B64D 27/10 |
| 2020/0031481 A1* | 1/2020 | Gazzino | H02S 10/10 |
| 2020/0277064 A1* | 9/2020 | Thomassin | H02P 29/028 |
| 2020/0277072 A1 | 9/2020 | Zoppitelli et al. | |
| 2021/0061451 A1* | 3/2021 | Gons | F02C 9/42 |
| 2021/0155179 A1* | 5/2021 | Lavoie | H02J 4/00 |

OTHER PUBLICATIONS

French Search Report for French Application No. FR2101689, Completed by the French Patent Office, Dated Nov. 9, 2021, 16 pages.

* cited by examiner

METHOD AND DEVICE FOR CONTROLLING A THERMAL AND ELECTRICAL POWER PLANT FOR A ROTORCRAFT

CROSS REFERENCE TO RELATED APPLICATIONS

This application claims priority to French patent application No. FR 2101689 filed on Feb. 22, 2021, the disclosure of which is incorporated in its entirety by reference herein.

TECHNICAL FIELD

The present invention relates to a method and a device for controlling a thermal and electrical power plant for a rotorcraft. The invention lies in the technical field of a thermal and electrical power plant for aircraft, and more particularly power plants for rotorcraft.

BACKGROUND

A rotorcraft is conventionally provided with at least one member, referred to hereinafter as a "rotary member", for providing its lift and/or its propulsion. A rotorcraft therefore comprises at least one rotary wing forming a main rotor. A rotorcraft may also comprise at least one auxiliary rotor, for example a rear rotor. A rotorcraft may also comprise one or more propellers intended mainly for propelling the rotorcraft.

A rotorcraft is also provided with a power plant for setting in motion the various abovementioned rotary members, and in particular the one or more rotors and the one or more possible propellers.

For this purpose, the power plant may comprise one or more heat engines that set in motion a power transmission system. The power transmission system then rotates at least one of the various abovementioned rotary members. Such a power transmission system may comprise a main gearbox leading in particular to the possible main rotor, a rear gearbox leading to a possible rear rotor, one gearbox per possible propeller, shafts, connection means, etc.

In addition, a failure of the one or more heat engines may cause the rotorcraft to enter a non-motorized autorotation flight phase.

The power plant may be equipped with an electric motor kit to assist the one or more heat engines in the event of a failure. The rotorcraft then has a thermal and electrical power plant for setting in motion the power transmission system.

It should be noted that, in the interest of convenience, the term "heat engine" refers throughout the text to any engine that operates with fuel that can be used in such a power plant for a rotorcraft, for example turboshaft engines or else piston engines. The term "heat engine" is used in contrast to the term "electric motor", which describes motors driven by electrical energy.

An electric motor of a hybrid power plant may be used only in motor mode in order to convert electrical energy into mechanical energy. An electric motor may also be an electric machine combining the motor mode with an electric generator mode in order to convert mechanical energy into electrical energy to recharge a rechargeable electrical energy source, for example.

Documents FR 2 994 687 and FR 3 090 576 thus describe a hybrid power plant for a rotorcraft equipped with a single heat engine, an electric motor, a main gearbox and an electrical energy storage means. In the event of a failure of the heat engine, the electric motor supplies mechanical power in order to assist the pilot of the rotorcraft in carrying out an autorotation flight phase following the failure.

Document US2019/0322382 describes a hybrid propulsion engine for an aircraft comprising at least one heat engine and at least one electric motor connected to a rotary member of the hybrid propulsion engine by drive shafts. The hybrid propulsion engine may operate in a plurality of operating modes in which the heat engine and electric motor drive the rotary member of the hybrid propulsion engine jointly or separately. A controller controls the switching between the operating modes as a result of an input from a pilot and/or depending on one or more parameters, such as the speed of the aircraft, the altitude of the aircraft or one or more states of the heat engine and/or the electric motor.

SUMMARY

An object of the present invention is therefore to propose an alternative method and device for managing the energy supplied by a thermal and electrical power plant for setting in motion at least one rotor of a rotorcraft with the aim of optimizing the operation of the rotorcraft according to its environment.

The invention relates to a method for controlling a thermal and electrical power plant for setting in motion at least one rotary member of a rotorcraft, said power plant comprising a thermal system and an electrical system for setting in motion a power transmission system connected to said at least one rotary member, the thermal system having at least one heat engine and the electrical system being provided with at least one electric machine, said electrical system having an electrical energy source electrically connected to said at least one electric machine.

The method comprises selecting, with a selector, an operating mode chosen from several operating modes, the method having a hybridization phase comprising the following steps:

comparing, with a controller, a current density altitude and a threshold density altitude; and
  controlling, with the controller, said at least one electric machine, depending on said chosen operating mode as well as said step of comparing a current density altitude and a threshold density altitude and a necessary power to be supplied to said power transmission system.

In particular, the controller controls the electric machine according to one of the operating modes, the applied mode being, or not being, the chosen operating mode, depending on said comparison and the necessary power. The necessary power corresponds to the power required by the aircraft to perform the requested flight scenario. This necessary power may correspond, at any point in time, to the sum of the powers transmitted to the power transmission system by the one or more heat engines and the one or more electric machines, and possibly to the energy losses of the power transmission system and the power taken off to drive accessories.

The necessary power may be calculated, for example, using stored laws and/or one or more power sensors. Such a power sensor may be arranged on the power transmission system, on a working shaft of a heat engine or on a working shaft of an electric machine. A power sensor may comprise a torquemeter and a rotational speed sensor as well as a computing means, for example, the power being equal to the product of the measured torque and the measured speed of rotation.

The method thus includes determining a current density altitude at a current position of said rotorcraft. This step may be carried out outside or during the hybridization phase.

The rotary member may be a member contributing to the movement of the aircraft, such as a rotary wing contributing at least to the lift of the rotorcraft, a rotor for controlling the yaw movement of the rotorcraft, or a propeller, for example.

The expression "power plant comprising a thermal system and an electrical system for setting in motion a power transmission system connected to said at least one rotary member" means that the one or more heat engines and the one or more electric machines can set in motion the power transmission system.

Therefore, an individual can operate the selector in order to select an operating mode. The controller applies the chosen operating mode or another operating mode depending on the choice made but also on the current density altitude and the necessary power, or indeed an available power that can be produced for flight at any point in time by the thermal system. The controller applies a law to determine the operating mode according to which the one or more electric machines should operate. Consequently, the controller transmits a command signal to the one or more electric machines to apply the appropriate operating mode according to the current situation, namely according to the pilot's choice and the current flight scenario. For example, a command signal may carry the mechanical power to be supplied or to be taken off by the electric machine receiving it.

The term "signal" may refer, for example, to an analog, digital, discrete, electrical or optical signal. A command signal may, for example, be in the form of an electric current having a current intensity that is the image of a mechanical power to be supplied or taken off.

Indeed, a rotorcraft often operates in a first flight envelope at low altitude in order to carry out its mission. In this case, the power transmitted to the rotary members is essentially limited by the power that can be produced by the power transmission system. Such power is referred to hereinafter as "maximum limit power".

A rotorcraft may also sometimes operate in a second flight envelope, namely at high altitude or at low altitude but in a very hot climate. In this case, the power transmitted to the rotary members is essentially limited by the available power that can be produced jointly by the one or more heat engines. The available power may be obtained by the controller by means of a stored law giving this available power as a function of the current density altitude, or indeed as a function of the atmospheric pressure and the outside temperature, or may be determined by an engine computer or another member, for example.

The controller therefore determines the flight envelope in which the aircraft is operating by comparing the current density altitude to a stored threshold density altitude. Depending on the current flight envelope and the choice made by an individual using the selector, the controller controls the one or more electric machines during the hybridization phase in order to optimize the operation of the aircraft with regard to the most relevant limitation in the current flight envelope.

The method may in particular comprise one or more of the following features, taken individually or in combination.

In particular, the method can apply various steps during successive loops.

According to one possibility, said several operating modes may comprise a standby mode during which said at least one electric machine is stopped or in electric generator mode in order to recharge said electrical energy source during a recharging phase, an economy mode during which said at least one electric machine operates in motor mode and the thermal system delivers a reduced, for example predetermined, power, and a high-performance mode during which said at least one electric machine operates in motor mode and the thermal system delivers a predetermined maximum main power, and the controller may control said at least one electric machine according to said standby mode when, concurrently, said chosen operating mode is said high-performance mode and said current density altitude is less than the threshold density altitude.

When the standby mode is commanded by the controller, the one or more electric machines are, where applicable, stopped by the controller if they are operating in motor mode. The one or more electric machines then switch, if necessary and as ordered by the controller, to electric generator mode in order to recharge the electrical energy source. This standby mode makes it possible to detect whether an electric machine is in a configuration suitable for electrical recharging and thus makes it possible, if necessary, to activate recharging via operation in electric generator mode.

When the high-performance mode is activated by the controller, the one or more electric machines operate in motor mode in order to provide additional mechanical power for performance purposes. This additional mechanical power makes it possible, for example, to compensate for the reduction in mechanical power produced by the one or more heat engines due to the atmospheric conditions, in particular. The additional mechanical power is established to comply with the maximum limit power that can be accepted by the power transmission system. Furthermore, the additional mechanical power may be limited so as not to exceed the power limit of the electric machine. Autorotation assistance is also available in this mode.

When the economy mode is activated by the controller, the one or more electric machines operate in motor mode in order to provide additional mechanical power for economic purposes. This additional mechanical power is determined, for example, so that the power to be supplied by the one or more heat engines is a reduced power allowing for lower fuel consumption with acceptable efficiency. Autorotation assistance is also available. The reduced power may be predetermined or may depend on the power produced by the electric machine.

Regardless of the chosen operating mode and the flight scenario, an autorotation operating mode is therefore always available. In the event of failure of the heat engines or at the request of the pilot using a suitable interface, the one or more electric machines switch, as ordered by the controller, to the motor mode for autorotation assistance.

Thus, according to one possibility compatible with the preceding possibility, said at least one rotary member being able to comprise a rotary wing, said method may comprise determining a failure of the thermal system rendering it inoperative, and determining a speed of rotation of the rotary wing, said method comprising commanding, with the controller, operation of said at least one electric machine in motor mode in the presence of said failure and said speed of rotation greater than zero.

The expression "failure of the thermal system rendering it inoperative" means that the thermal system is no longer able to set in motion the power transmission system. Such a failure may be determined in a conventional manner by means of a monitoring computer, for example an engine computer, transmitting the failure information to the controller.

Optionally, the controller may transmit an autorotation alert signal to an alerter in these conditions.

Optionally, the method may include the following steps: comparing the speed of rotation with a stored autorotation speed, commanding, with the controller, said at least one electric machine to deliver a maximum auxiliary power in motor mode if said speed of rotation is less than said autorotation speed, commanding, with the controller, said at least one electric machine to deliver, in motor mode, a power less than said maximum auxiliary power if said speed of rotation is greater than or equal to said autorotation speed.

The maximum auxiliary power is the highest power that can be produced by an electric machine.

If the speed of rotation is less than said autorotation speed, the one or more electric machines inject a maximum of power into the power transmission system in order to place the aircraft in the required autorotation configuration.

If this is not the case, the one or more electric machines inject less power into the power transmission system in order to enlarge the autorotation cone and increase the area of a reachable landing zone.

According to one possibility compatible with the preceding possibilities, the method may include detecting a malfunction of said electrical system, said hybridization phase being prohibited when said malfunction is present, and therefore, on the contrary, authorized when said malfunction is absent.

Optionally, the controller may transmit an alert signal to an alerter in order to indicate the malfunction of the electrical system.

According to one possibility compatible with the preceding possibilities, the method may comprise measuring an electrical capacity of said electrical energy source, said hybridization phase being prohibited if a measured electrical capacity is less than an electrical capacity threshold, said method comprising commanding, with said controller, a said phase for recharging said electrical energy source by commanding operation of said electric machine in electric generator mode when said measured electrical capacity is less than or equal to the electrical capacity threshold.

Optionally, the controller may transmit a low electrical capacity alert signal to an alerter in these conditions.

When the one or more electric machines are operating in motor mode, these electric machines are stopped before switching to electric generator mode for the electrical recharging of the electrical energy source.

According to one possibility compatible with the preceding possibilities, said at least one rotary member being able to comprise a rotary wing, said method may comprise measuring a speed of rotation of the rotary wing, said hybridization phase being prohibited by the controller if a measured speed of rotation does not lie within a reference rotational speed range.

The reference rotational speed range may be set and stored in the controller or may be variable. For example, an engine computer or other computer transmits the value of a variable reference speed to the controller, the reference rotational speed range being a function of this reference speed. By way of illustration, the reference rotational speed range may be equal to the value of the reference speed plus or minus one percent.

Optionally, the controller may transmit an alert signal relating to a low speed of rotation of the rotary wing to an alerter when the measured speed of rotation does not lie within the reference rotational speed range. When the one or more electric machines are operating in motor mode, these electric machines are stopped.

According to one possibility compatible with the preceding possibilities, said at least one heat engine being able to be controlled by an engine computer, said engine computer may comprise an automatic mode during which said engine computer controls the power delivered by the controlled heat engine in function of a speed of rotation of said at least one rotary member.

The automatic mode of the engine computer makes it possible to automatically regulate the power produced by a heat engine according to the operation of the one or more electric machines.

According to one possibility compatible with the preceding possibilities, the method may include a step of determining the mode applied by the engine computer, said hybridization phase being authorized by the controller only when said engine computer is operating in said automatic mode.

Optionally, the controller may transmit an alert signal prohibiting the hybridization phase to an alerter. When the one or more electric machines are operating in motor mode, these electric machines are stopped.

According to one possibility compatible with the preceding possibilities, during the hybridization phase, the method may include determining an available power that can be produced by the thermal system.

Such an available power may be determined in a conventional manner, using a law stored, for example, in the controller or in another member. This characteristic makes it possible to adapt the control of the one or more electric machines depending on the maximum power that can be produced by the one or, where applicable, more heat engines.

According to one possibility compatible with the preceding possibilities, when said current density altitude is greater than said threshold density altitude and said chosen operating mode is the high-performance mode, the method may include the following steps:

determining, with the controller, whether said necessary power lies within or outside a test range ranging from said available power that can be produced by the thermal system up to a maximum limit power that can be accepted by said power transmission system, said available power and said maximum limit power being respectively excluded from said test range;

applying, with the controller, the high-performance mode when said necessary power lies within said test range; and applying, with the controller, the standby mode when said necessary power lies outside said test range.

Even if the high-performance mode is selected, the controller implements the standby mode if the necessary power does not lie within in the stored test range so as not to exceed the maximum limit power that can be accepted by said power transmission system.

According to one possibility compatible with the preceding possibilities, when said current density altitude is greater than said threshold density altitude and said chosen operating mode is the economy mode, the method may include the following steps:

determining, with the controller, whether said necessary power is less than or greater than or equal to said available power that can be produced by the thermal system;

applying, with the controller, the economy mode when said necessary power is less than the available power; and applying, with the controller, the standby mode when said necessary power is greater than or equal to the available power.

Even if the economy mode is selected, the controller implements the standby mode if the necessary power is greater than or equal to the available power.

According to one possibility compatible with the preceding possibilities, when said current density altitude is less than or equal to said threshold density altitude and said chosen operating mode is the economy mode, the method may include:

determining, with the controller, whether said necessary power is less than or greater than or equal to a maximum limit power that can be accepted by said power transmission system;

applying, with the controller, the economy mode when said necessary power is less than the maximum limit power; and applying, with the controller, the standby mode when said necessary power is greater than or equal to the maximum limit power.

According to one possibility compatible with the preceding possibilities, when the economy mode is chosen from said several operating modes, the method may comprise commanding, with the controller, said at least one electric machine to supply, in motor mode, a power equal to the product of an economy transfer function and either an economy power or a difference between the necessary power and a predetermined reduced power.

The power produced by an electric machine during the economy mode may be predetermined or variable.

The economy power may be stored or set by a pilot or co-pilot, using a human-machine interface transmitting a signal carrying a value of the economy power to the controller.

According to one possibility compatible with the preceding possibilities, when the high-performance mode is chosen from said several operating modes, the method may comprise commanding, with the controller, said at least one electric machine to supply, in motor mode, a power equal to the product of a high-performance transfer function and either a high-performance power or a difference between a predetermined maximum limit power that can be accepted by said power transmission system and the necessary power.

The power produced by an electric machine during the high-performance mode may be predetermined or variable.

The high-performance power may be stored or set by a pilot or co-pilot, using a human-machine interface transmitting a signal carrying a value of the high-performance power to the controller.

According to one possibility compatible with the preceding possibilities, a recharging phase may comprise the following steps:

determining whether a forward speed of said rotorcraft lies within a stored forward speed range;

determining whether an electrical capacity of said electrical energy source is less than a recharging threshold; and as long as said forward speed of said rotorcraft lies within said forward speed range and the electrical capacity of said electrical energy source is less than the recharging threshold, recharging said electrical energy source by controlling, with the controller, said at least one electric machine in electric generator mode.

Electrical energy recharging therefore only takes place when the aircraft is moving at a speed requiring a minimum of mechanical power.

The recharging threshold may be greater than the electrical capacity threshold.

The invention also relates to a rotorcraft provided with at least one rotary member, the rotorcraft comprising a thermal and electrical power plant for setting in motion the at least one rotary member, said power plant comprising a thermal system and an electrical system for setting in motion a power transmission system connected to said at least one rotary member, the thermal system having at least one heat engine and the electrical system being provided with at least one electric machine, said electrical system having an electrical energy source electrically connected to said at least one electric machine.

The rotorcraft comprises a selector for selecting an operating mode chosen from several operating modes, said rotorcraft comprising a controller connected to the selector as well as to a density altitude sensor and a sensor for sensing a necessary power to be supplied to said power transmission system, said controller being configured to control said at least one electric machine by applying the method of the invention.

Density altitude is not to be confused with altitude or density, but corresponds to the pressure altitude corrected for temperature. The density altitude is calculated in a conventional manner, for example using the atmospheric pressure, measured with a barometer or the like, and a temperature measured with a thermometer or other temperature sensors.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
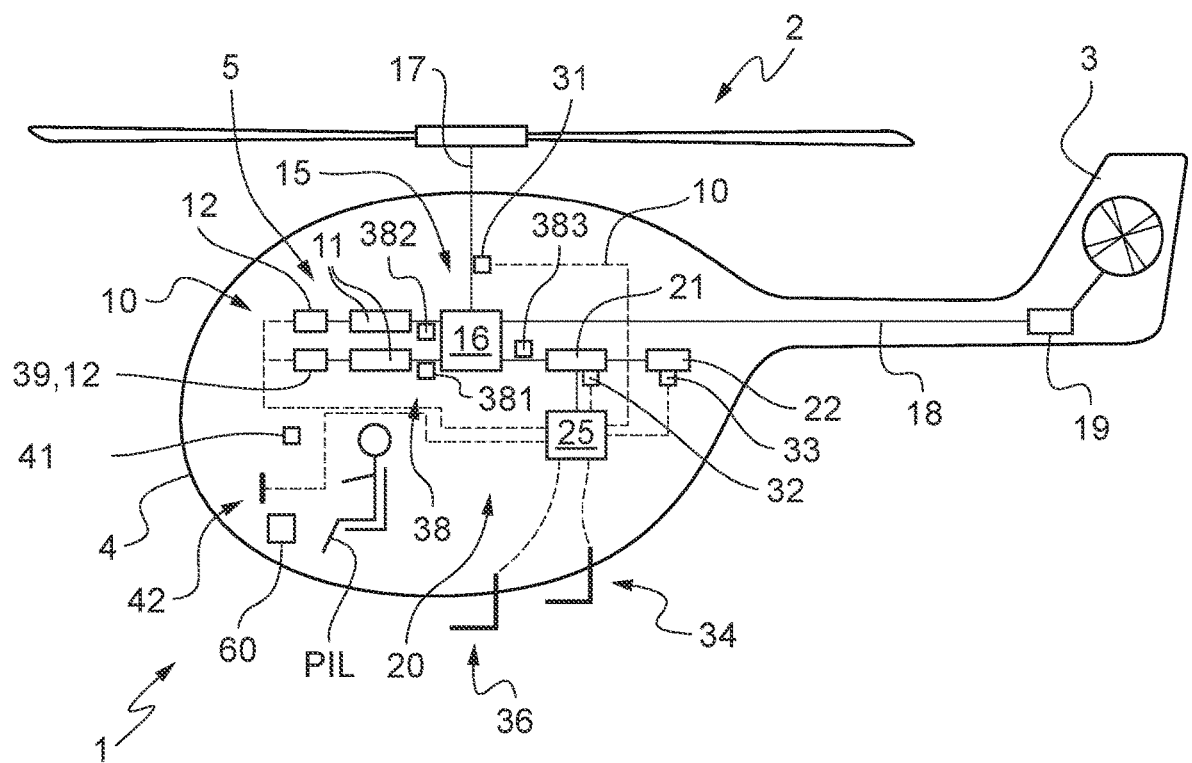
FIG. 1 is a view of an aircraft according to the invention.

FIG. 1 shows a rotorcraft 1 according to the invention. This rotorcraft comprises at least one rotary member 2, 3. Each rotary member 2, 3 can contribute in the movement or lift of this aircraft. For example, the rotorcraft 1 comprises a rotary member in the form of a rotary wing 2 carried by an airframe 4. The rotorcraft 1 may further comprise at least one propeller and/or at least one rear rotor 3 helping control the yaw of the airframe 4. In order to set in motion the one or more rotary members 2, 3, the rotorcraft 1 includes a thermal and electrical power plant 5. The power plant 5 thus comprises a power transmission system 15 connected to the one or more rotary members 2, 3. Such a power transmission system 15 may comprise one or more gearboxes, one or more shafts, connection means, etc. According to the example shown, the power transmission system 15 comprises a main gearbox 16 setting in motion a rotor mast 17 connected to the rotary wing 2. Moreover, the power transmission system 15 comprises at least one shaft 18 connecting the main gearbox 16 to a rear gearbox 19 rotating a rear rotor 3.

Consequently, the power plant 5 comprises a thermal system 10 provided with one or more heat engines 11 that set in motion the power transmission system 15, and in particular the internal members of the main gearbox 16 according to the example shown. Regardless of the number of heat engines, each heat engine is controlled by its own engine computer 12, for example. When several heat engines 11 are present, the engine computers can communicate with one another. In addition, each heat engine 11 may, for example, be a turboshaft engine or indeed a piston engine.

The power plant 5 also comprises an electrical system 20. This electrical system 20 comprises one or more electric machines 21 capable of operating in motor mode in order to set in motion the power transmission system 15, directly or indirectly. For example, an electric machine 21 may be connected to the power transmission system 15, and in particular to the main gearbox 16, as in the example shown, or to a heat engine 11.

Regardless of the number of electric machines 21, each electric machine 21 can also operate in electric generator mode, so as to produce electrical energy by being set in motion by the power transmission system or by a heat engine 11.

When associated with an object, the term "each" may be used regardless of the number of objects and may be likened to the expression "the one or, where applicable, more".

Each electric machine 21 is connected to an electrical energy source 22. This electrical energy source 22 is rechargeable so as to supply electricity to each electric machine 21 operating in motor mode and to be supplied with electricity by each electric machine 21 operating in electric generator mode. The electrical energy source 22 may typically comprise batteries or the like, a hydrogen cell or the like, etc.

Furthermore, the rotorcraft 1 includes a controller 25 in communication, in particular, with each electric machine 21, in order to transmit a command signal to them indicating the manner in which they must operate.

By way of example, the controller 25 may comprise at least one processor and at least one memory, at least one integrated circuit, at least one programmable system, or at least one logic circuit, these examples not limiting the scope to be given to the term "controller". The term "processor" may refer equally to a central processing unit (CPU), a graphics processing unit (GPU), a digital signal processor (DSP), a microcontroller, etc. For example, the controller 25 may comprise one or more computers that may or may not be dedicated to the method of the invention. Several computers of the system may form one and the same computer, and, for example, the controller 25 and the monitoring computer 39 referred to hereinafter. For example, the controller 25 forms part of an assembly referred to as the "Aircraft Management Computer".

The rotorcraft 1 comprises a conventional density altitude sensor 34 in wired or wireless communication with the controller 25. The term "sensor" used hereinafter may refer to an assembly comprising one or more sensors or even a computer. Thus, a density altitude sensor 34 may comprise an altimeter and a thermometer, for example. The density altitude sensor 34 transmits a signal carrying the current density altitude Zt to the controller 25.

The rotorcraft 1 may also include a mechanical power sensor 32 determining a mechanical power Pwe produced or taken off by an electric machine 21. Such a mechanical power sensor 32 may comprise, for example, for each electric machine 21, a torquemeter and a rotational speed sensor positioned on a power shaft of the electric machine 21. According to another example, the power consumption or the direction of rotation of such a shaft may be measured and used to evaluate the mechanical power Pwe in a conventional manner. In addition, at least one conventional monitoring sensor is configured to determine whether the machine is operating properly, such as a sensor measuring a current intensity compared to a reference. Each monitoring sensor may transmit to the controller, directly or indirectly, a monitoring signal carrying information indicating whether the electric machine has failed.

The rotorcraft 1 may also comprise an electrical capacity sensor 33 measuring the current electrical capacity C of the electrical energy source 22.

The rotorcraft 1 may also include a forward speed sensor 36 measuring a speed of movement of the rotorcraft 1. For example, such a sensor 36 comprises a satellite positioning system, a Pitot tube system, etc. For example, the forward speed is the true air speed.

The rotorcraft 1 may also comprise a rotational speed sensor 31 measuring the speed of a rotating member of the power plant 5, and in particular of a rotary member or a member that moves jointly with a rotary member. For example, a rotational speed sensor 31 measures the speed of rotation of the rotor mast 17, which is representative of the speed of rotation of the rotary wing 2. The rotational speed sensor 31 may transmit a signal carrying the speed of rotation Nr to the controller 25 and also to each engine computer 12.

Indeed, an engine computer 12 can control the associated heat engine 11 in a conventional manner, during an automatic mode, depending on a fixed or variable reference speed and a speed of rotation Nr measured by the rotational speed sensor 31, and in particular depending on a speed of rotation Nr of the rotary wing. The power produced by a heat engine 11 may then vary automatically depending on the power produced or taken off by an electric machine 21. The power produced by a heat engine 11 is also limited so as not to exceed a limit power of the engine that varies depending on the density altitude and so that the power transmitted by the power transmission system 15 does not exceed a maximum limit power Lbtp.

When a single heat engine is present, the available power Pwdt is equal to the limit power of the heat engine. When several heat engines are present, the available power Pwdt is equal to the sum of the limit powers of the engines.

The available power Pwdt may be determined by an estimator using a stored law that provides this available power Pwdt as a function of the density altitude. The estimator may be the controller 25, or another member transmitting a signal carrying this available power Pwdt to the controller 25, for example.

The rotorcraft 1 may include a conventional sensor 38 for sensing a necessary power WNEC to be supplied to the power transmission system. For example, the sensor 38 for sensing a necessary power may comprise one or more power sensors 381, 382, 383 arranged on the power transmission system 15 or on a working shaft of a heat engine or an electric machine. A power sensor may comprise a torquemeter and a rotational speed sensor, for example. According to the example shown, the sensor 38 for sensing a necessary power may comprise a power sensor 381, 382, 383 at the output of each heat engine and each electric machine. The necessary power is then calculated by an evaluator by summing the measured powers. The evaluator may be the controller 25 or a conventional member.

The rotorcraft may include a monitoring computer 39 configured to determine whether the one or more heat engines have failed. For example, the monitoring computer 39 is an engine computer 12. If appropriate, the monitoring computer transmits a signal to the controller 25 carrying a failure rendering the thermal system 10 inoperative.

Optionally, the rotorcraft 1 may include a human-machine interface 41 connected to each engine computer 12 in order to request the implementation of the automatic mode for controlling the corresponding heat engine 11.

Optionally, the rotorcraft 1 may include a human-machine interface 41 connected to the controller 25 in order to set a high-performance power Psperfo and/or an economy power Pseco. The high-performance power Psperfo may be greater than the economy power Pseco.

Optionally, the controller 25 may communicate with an alerter 60 to generate an alert. Such an alerter 60 may comprise a screen displaying a message, and/or an audible means and, for example, a loudspeaker, and/or a light, etc.

According to another aspect, the rotorcraft 1 includes a selector 42 in wired or non-wired communication with the controller 25 for selecting an operating mode. The selector 42 transmits a signal carrying a chosen operating mode. For example, the selector 42 may comprise a knob with several positions, a touch panel, etc. In particular, the selector 42 may allow a pilot Pil to select an operating mode from a standby mode MODV, a high-performance mode MODPERF and an economy mode MODECO.

When the standby mode MODV is implemented by the controller 25, the one or more electric machines 21 are stopped, if applicable, or, if necessary, at least one electric machine is switched to electric generator mode to recharge the electrical energy source 22 during a recharging phase STPRECHARGE, for example by applying a function Fr(t).

When the economy mode MODECO is implemented by the controller 25, at least one or indeed each electric machine 21 operates in motor mode such that the one or more heat engines 11 deliver a reduced power, for example a predetermined power Ptm.

When the high-performance mode MODPERF is implemented by the controller 25, at least one or indeed each electric machine 21 operates in motor mode and the one or more heat engines 11 deliver a power that can reach the available power.

At any time and regardless of the chosen operating mode, the controller 25 can implement an autorotation operating mode.

Consequently, the method of the invention requires the selection STPSELECT of an operating mode chosen by operating the selector 42. During a hybridization phase, the controller 25 also compares the current density altitude Zt with a stored threshold density altitude Zs. Therefore, the controller 25 controls each electric machine 21 depending on the chosen operating mode, the value of the current density altitude Zt with regard to the threshold density altitude Zs, and the necessary power Wnec. To this end, the controller 25 transmits a command signal to an electric machine 21 in order to control it, this command signal carrying a power to be supplied or taken off by the electric machine 21.

Figure 7:
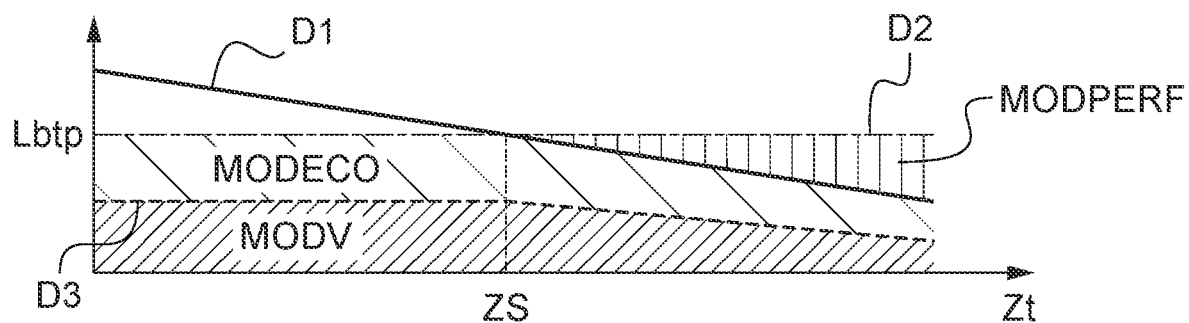
FIG. 7 is a diagram showing the hybridization phase with one or more electric machines delivering variable mechanical power in motor mode.
Figure 8:
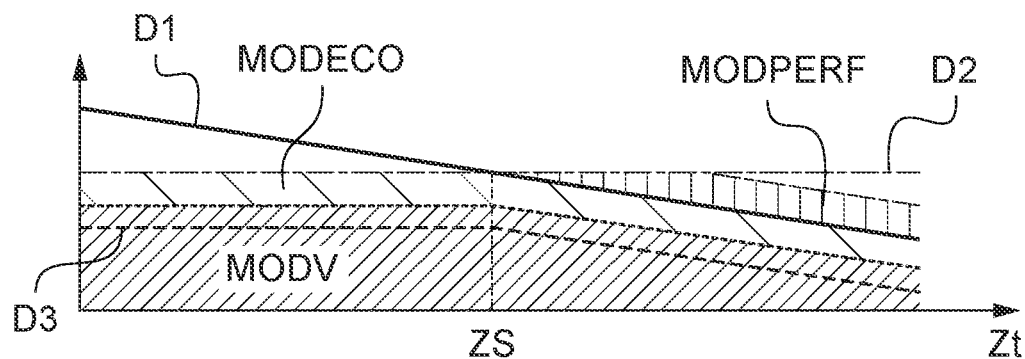
FIG. 8 is a diagram showing the hybridization phase with one or more electric machines delivering constant mechanical power in motor mode.

FIGS. 7 and 8 show diagrams displaying power on the Y-axis and density altitude on the X-axis. A line D1 shows the available power that can be produced jointly by the one or more heat engines 11. A horizontal line D2 shows the maximum limit power Lbtp that can be accepted by the power transmission system 15. A line D3 shows a predetermined reduced power Ptm optimizing the operation of the one or more heat engines 11. According to FIG. 7, the one or more electric machines 21 can provide a power that varies depending on the need whereas, according to FIG. 8, the one or more electric machines 21 provide a stored power or a power set by a pilot or a co-pilot. The diagrams are provided for illustrative purposes only.

With reference to FIG. 7, when the current density altitude Zt is greater than a threshold density altitude Zs, all the operating modes are accessible. The controller 25 determines the mode to be applied depending on the chosen operating mode, the necessary power Wnec or indeed the available power Pwdt. During standby mode MODV, each electric machine 21 is switched off or in electric generator mode.

During the economy mode MODECO, each electric machine 21 can operate in motor mode in order to supply mechanical power Pwe. According to FIG. 7, the mechanical power Pwe is adjusted by the controller 25 so that the one or more heat engines 11 automatically provide a reduced power Ptm and so as not to exceed the maximum limit power. According to FIG. 8, the mechanical power Pwe is fixed, and the reduced power is therefore variable.

During the high-performance mode MODPERF, the one or more heat engines 11 are controlled to provide the maximum thermal power and the one or more electric machines 21 operate in motor mode in order to provide additional power within the limit of the maximum limit power Lbtp that can be accepted by the power transmission system 15.

When the current density altitude Zt is less than or equal to the threshold density altitude Zs, if the chosen operating mode is the high-performance mode MODPERF, the controller 25 applies the standby mode MODV.

Consequently, and regardless of how the rotorcraft 1 is designed, the controller 25 can thus perform steps of the method in a loop. FIGS. 2 to 6 show possible steps of a loop.

Figure 2:
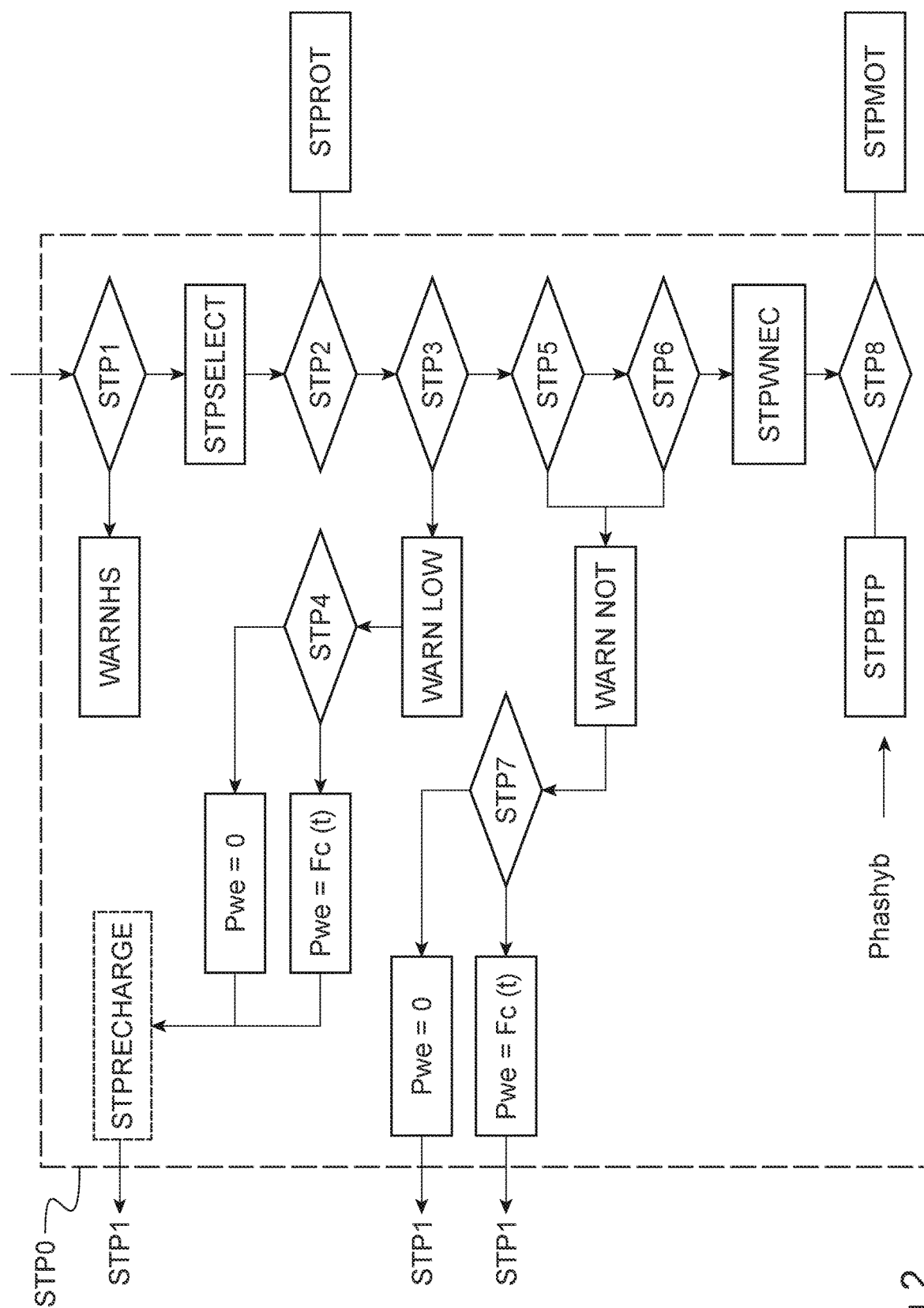
FIG. 2 is a diagram showing an example of a method for initiating the hybridization phase.

Thus, according to FIG. 2, the method may include a test phase STP0 for determining whether the hybridization phase Phashyb or an autorotation phase STPROT must be undertaken. Steps that are described may be optional and may be carried out in another order, or indeed simultaneously.

The hybridization phase Phashyb may in particular be conditional on normal operation of the electrical system 20.

The method may therefore include detecting STP1 a malfunction of the electrical system 20. For example, each electric machine 21, and indeed the electrical energy source 22, may comprise conventional monitoring sensors for determining the presence of a failure. These monitoring sensors communicate with the controller 25. If a monitoring sensor transmits, during a loop, a signal carrying a failure to the controller 25, the controller 25 does not implement the hybridization phase Phashyb. Conversely, the controller 25 can control an alerter 60 to generate an alert WARNHS. The loop of the method stops and a new loop begins.

The detection STP1 of a malfunction of the electrical system 20 may possibly be carried out at the start of the loop because, in the event of a malfunction, the electrical system 20 cannot be used.

Furthermore, the loop may include a step of determining whether an autorotation phase STPROT should be initiated. This step may be performed after the step of detecting a malfunction, due to its importance.

Thus, the method may include determining STP2 a failure of the thermal system 10 making it inoperative. In the absence of such a failure, the loop continues. If such a failure is present, an autorotation phase STPROT begins.

Figure 3:
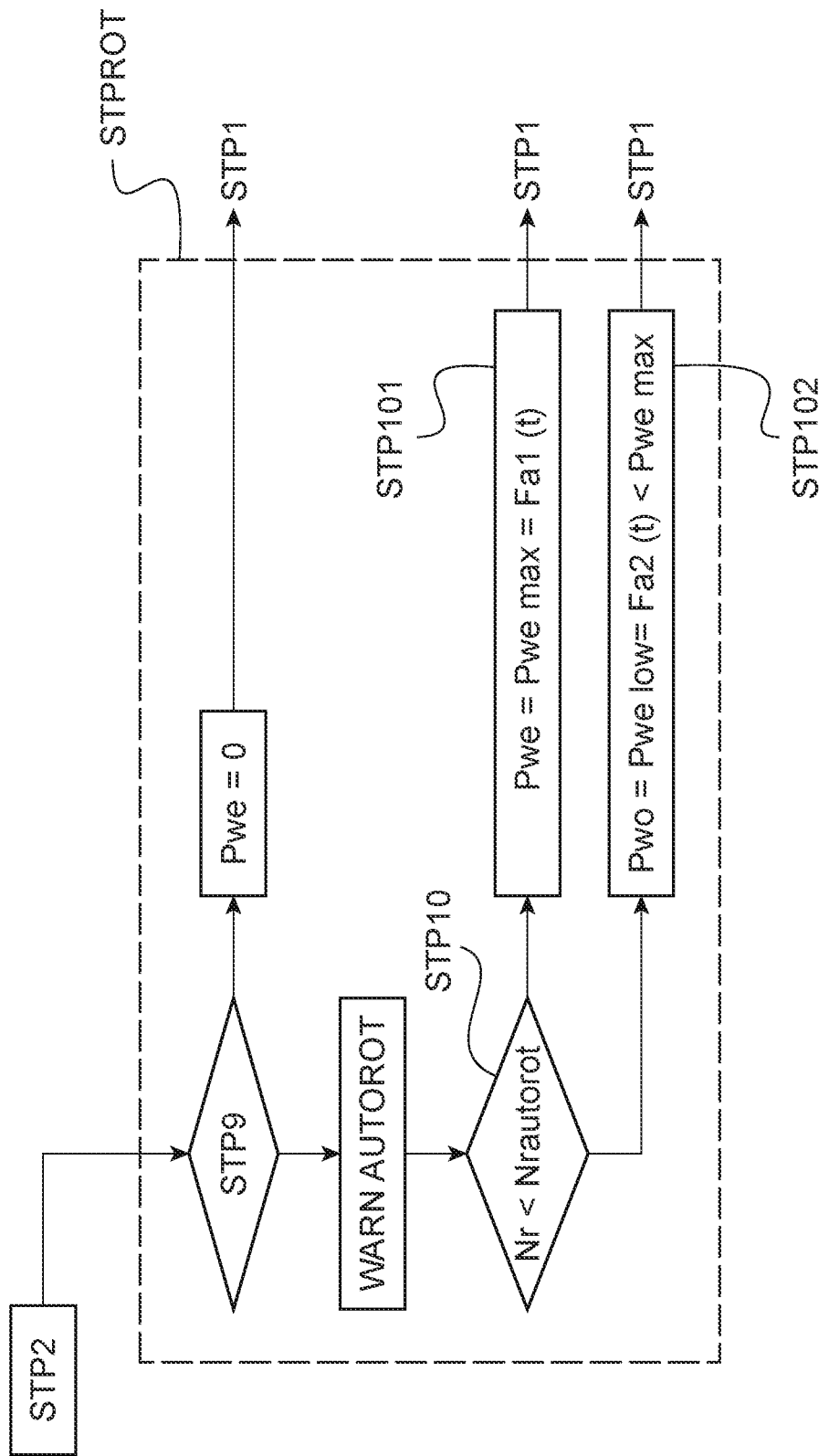
FIG. 3 is a diagram showing an example of an autorotation phase.

With reference to FIG. 3 and during an autorotation phase STPROT, the method comprises the determination STP9, by the controller 25, that the measured speed of rotation Nr is greater than zero. To this end, the controller 25 compares the measured speed of rotation Nr to zero. If the measured speed of rotation Nr is equal to zero, the rotorcraft is shut down. Each electric machine 21 remains switched off, providing zero mechanical power Pwe. The loop of the method stops and a new loop begins.

If the measured speed of rotation Nr is different from zero, at least one or indeed each electric machine 21 is controlled by the controller 25 to operate in motor mode.

Optionally, the method comprises comparing STP10, with the controller 25, the speed of rotation Nr with a stored autorotation speed Nrautorot. Consequently, during a step STP101, the controller 25 commands at least one or indeed each electric machine 21 to deliver, to the power transmission system 15, a mechanical power Pwe equal to a maximum auxiliary power Pwemax in motor mode if the speed of rotation Nr is less than the autorotation speed Nrautorot. The maximum auxiliary power Pwemax may be obtained by means of a first autorotation transfer function $Fa1(t)$. All the power of the electric machine is used to facilitate autorotation. The loop of the method stops and a new loop begins.

Conversely, during a step STP102, the controller 25 commands at least one or indeed each electric machine 21 to deliver, in motor mode, a moderate power Pwelow less than said maximum auxiliary power Pwemax if the speed of rotation Nr is greater than or equal to said autorotation speed Nrautorot. The moderate power Pwelow may be obtained by means of a second autorotation transfer function $Fa2(t)$. The loop of the method stops and a new loop begins.

This method allows maximum power to be automatically injected into the power transmission system 15 during the landing phase, referred to as "flare".

With reference to FIG. 2, the test phase STP0 may comprise measuring STP3 the current electrical capacity C of the electrical energy source 22 with the electrical capacity sensor 33. If the controller 25 determines that the current electrical capacity C is less than an electrical capacity threshold Cl, the controller 25 does not implement the hybridization phase. Optionally, the controller 25 controls the alerter 60 to transmit an alert WARNLOW. Optionally, the controller 25 then controls at least one or indeed each electric machine 21 to electrically recharge the electrical energy source 22 during a recharging phase STPRECHARGE.

The controller 25 may previously determine, during a verification step STP4, whether an electric machine 21 is operating in motor mode, for example by means of the mechanical power sensor 32. If this is the case, the controller 25 transmits a signal to the electric machine 21 in order to stop it, for example by applying a stored stop transfer function Fc(t). The recharging phase STPRECHARGE then begins.

Figure 6:
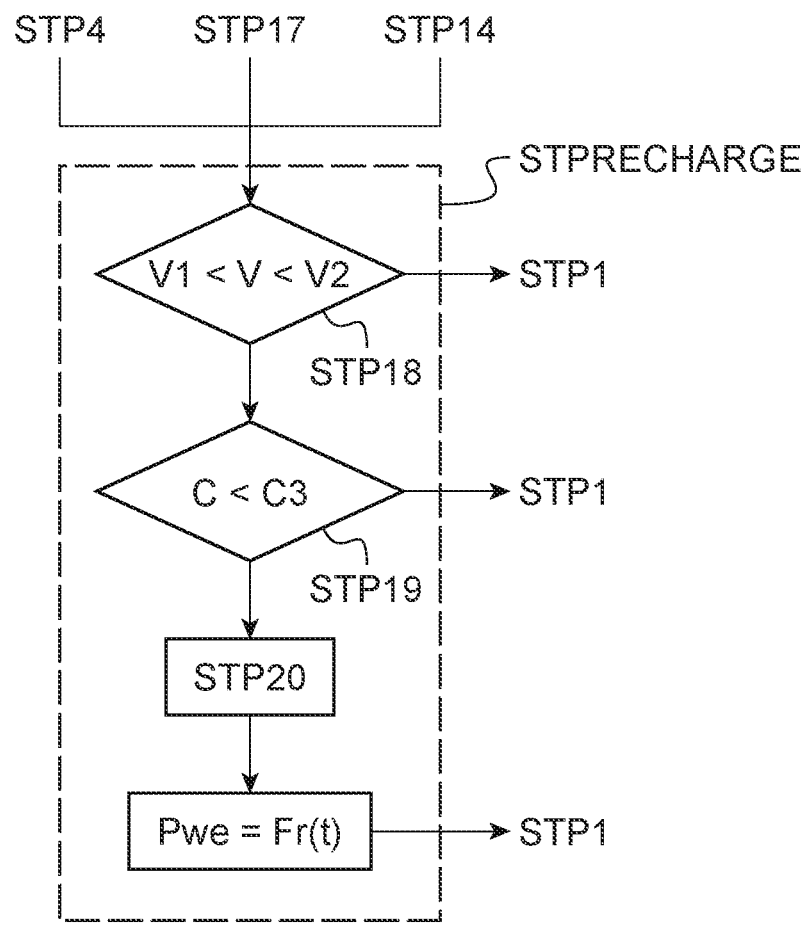
FIG. 6 is a diagram showing an example of a recharging phase.

FIG. 6 shows an example of a recharging phase STPRECHARGE. Optionally, during a step STP18, the controller 25 may determine whether the forward speed V of the rotorcraft 1 lies within a stored forward speed range, by means of the forward speed sensor 36. For example, this range is defined between a low speed greater than the speed of best rate of climb Vy and a high speed. The high speed may be the cruising speed of the rotorcraft, also referred to as the "recommended transit speed". To this end, the controller 25 can receive a signal carrying the forward speed from the forward speed sensor 36. If this is not the case, recharging cannot be performed and another loop starts.

Optionally, during a step STP19, the controller 25 may determine whether the current electrical capacity C of the electrical energy source 22 is less than a recharging threshold C3. To this end, the controller 25 can receive a signal carrying the current electrical capacity C from the electrical capacity sensor 33. If this is not the case, recharging cannot be performed and another loop starts.

Consequently, as long as said forward speed V lies within said forward speed range and the current electrical capacity C is less than the recharging threshold C3, the controller 25 controls a step of recharging STP20 the electrical energy source 22 by controlling an electric machine 21 such that it operates in electric generator mode. The loop of the method then stops and a new loop begins.

With reference to FIG. 2, the test phase STEP0 may comprise a comparison STP5, by the controller 25, between the current speed of rotation Nr of the rotary wing 2 and a reference rotational speed range. To this end, the controller 25 may receive a signal carrying the current speed of rotation Nr from the rotational speed sensor 31 and may store or receive or calculate the reference rotational speed range.

If the current speed of rotation Nr of the rotary wing 2 does not lie within the reference rotational speed range, the hybridization phase Phashyb is prohibited by the controller 25. The loop of the method then stops and a new loop begins.

Optionally, the method may include determining STP6 the mode applied by the engine computer 12. To this end, the controller 25 may receive a signal carrying the mode applied by the engine computer 12 from the engine computer 12 or from the human-machine interface 41. If the engine computer 12 is not operating in the automatic mode, the hybridization phase Phashyb is prohibited by the controller 25. The loop of the method then stops and a new loop begins.

If the speed of rotation Nr does not lie within the reference rotational speed range or an engine computer 12 is not operating in the automatic mode, the controller 25 can control the alerter 60 to generate an alert WARNNOT. The controller 25 can determine, during a control step STP7, whether an electric machine 21 is in operation. If this is the case, the controller 25 transmits a signal to the electric machine 21 in order to stop it, for example by applying a stored stop transfer function Fc(t). The loop of the method then stops and a new loop begins.

The method may at any time include a step of selecting STPSELECT one operating mode chosen from several operating modes. The pilot PIL operates the selector 42 for this purpose. The selector 42 transmits a signal carrying the chosen operating mode to the controller 25.

The method may at any time include a step of determining STPWNEC the necessary power Wnec. For example, the controller 25 or an engine computer 12 can determine the necessary power Wnec to be supplied to the power transmission system 15 to ensure flight.

At any time and, for example, during step STP8, the method may include a step of determining the current density altitude Zt. The density altitude sensor 34 transmits a signal carrying this current density altitude to the controller 25.

If the hybridization phase Phashyb is authorized, during step STP8, the controller 25 compares the current density altitude Zt and a stored threshold density altitude Zs.

Depending in particular on this comparison, the controller 25 determines the signal to be transmitted to at least one electric machine 21 in order to control it.

Figure 4:
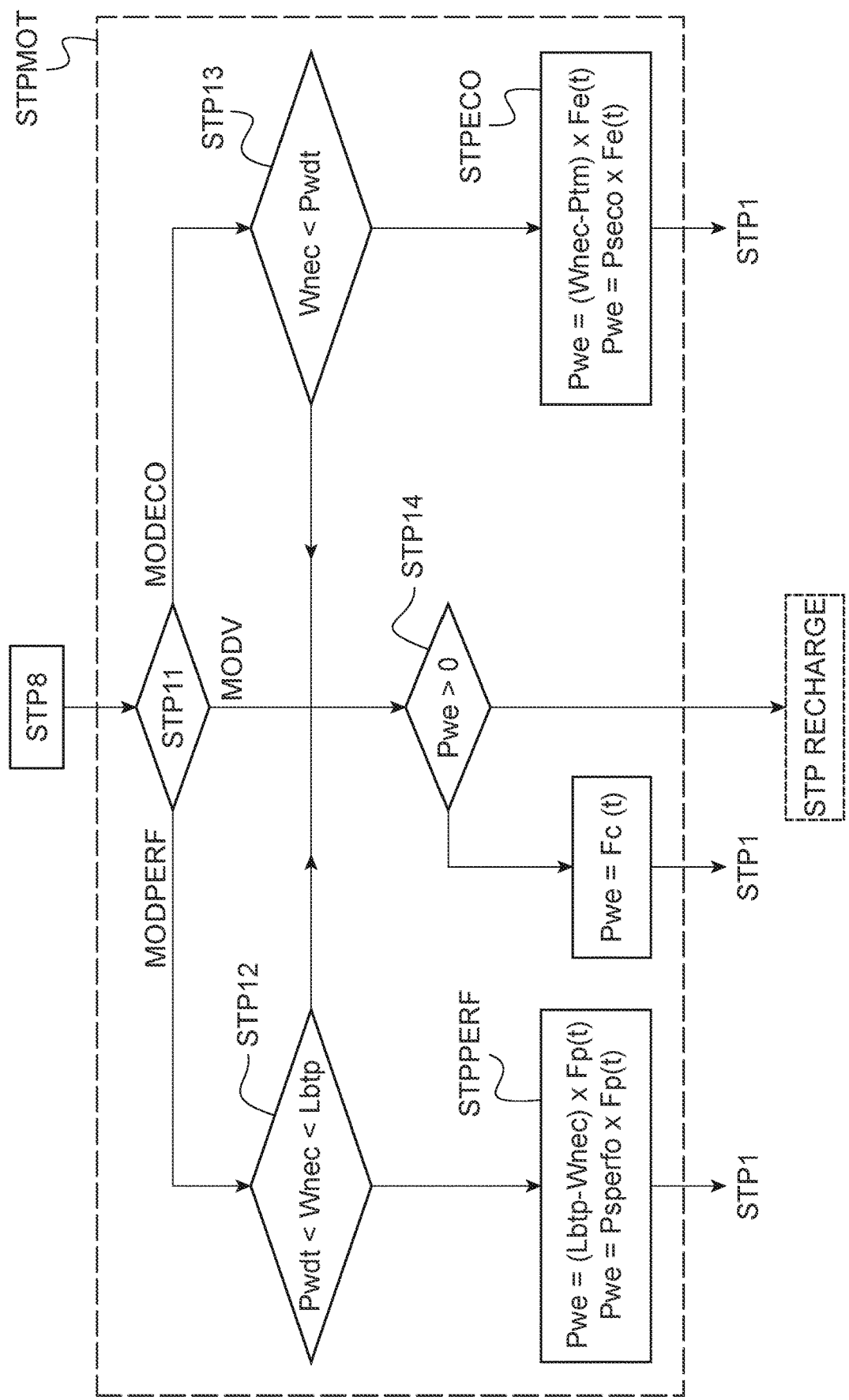
FIG. 4 is a diagram showing an example of a hybridization phase at high density altitude.

If the current density altitude Zt is greater than said threshold density altitude Zs, the controller 25 applies a motor limit phase STPMOT shown in FIG. 4. During a step STP11, the controller 25 determines the chosen operating mode depending on the signal transmitted by the selector 42.

If the chosen operating mode is the high-performance mode MODPERF, the controller 25 determines, during a determination step STP12, whether the necessary power Wnec lies within a test range, being greater than the available power Pwdt and less than the maximum limit power Lbtp. If this is the case, the controller 25 transmits a signal to at least one or indeed each electric machine 21 to apply the high-performance mode during a step STPPERF.

When the high-performance mode MODPERF is activated, the controller 25 transmits a signal to one or indeed each electric machine 21 such that it supplies, in motor mode, mechanical power Pwe equal either to the product of a high-performance transfer function Fp(t) and an high-performance power Psperfo, or the product of a high-performance transfer function Fp(t) and a difference between the maximum limit power Lbtp and the necessary power Wnec. According to one example, the signal transmitted by the controller 25 to an electric machine 21 carries the mechanical power Pwe to be supplied. The loop is then terminated and a new loop begins.

If the necessary power Wnec does not lie within the test range, the controller 25 transmits a signal to at least one or indeed each electric machine 21 to apply the standby mode MODV. Optionally, the alerter emits an alert to inform the pilot of this.

During the standby mode, the controller 25 determines, during a step STP14, whether the electric machine 21 is supplying a non-zero mechanical power Pwe. If the electric machine 21 is supplying a non-zero mechanical power Pwe, the controller 25 transmits a signal to the electric machine in order to stop it according to a stop transfer function Fc(t). The loop is then terminated and a new loop begins. If the electric machine 21 supplies zero mechanical power Pwe, a recharging phase STPRECHARGE is initiated.

If the chosen operating mode is the economy mode MODECO, the method comprises determining STP13, with the controller 25, whether the necessary power Wnec is less than or greater than or equal to the available power Pwdt. When the necessary power Wnec is less than the available power Pwdt, the controller 25 transmits a signal to at least one or indeed each electric machine 21 to implement the economy mode MODECO. If this is not the case, the controller 25 transmits a signal to at least one or indeed each electric machine 21 to implement the standby mode MODV. Optionally, the alerter emits an alert to inform the pilot of this.

When the economy mode MODECO is activated, the controller 25 can transmit a signal to one or indeed each electric machine 21 such that it supplies, in motor mode, mechanical power Pwe equal either to the product of an economy transfer function Fe(t) and an economy power Pseco, or to the product of an economy transfer function Fe(t) and a difference between the necessary power Wnec and the predetermined reduced power Ptm. According to one example, the signal transmitted by the controller 25 to an electric machine 21 carries the mechanical power Pwe to be supplied. The loop is then terminated and a new loop begins.

If the standby mode MODV is the chosen operating mode, the controller 25 transmits a signal to at least one or indeed each electric machine 21 to implement this standby mode MODV.

Figure 5:
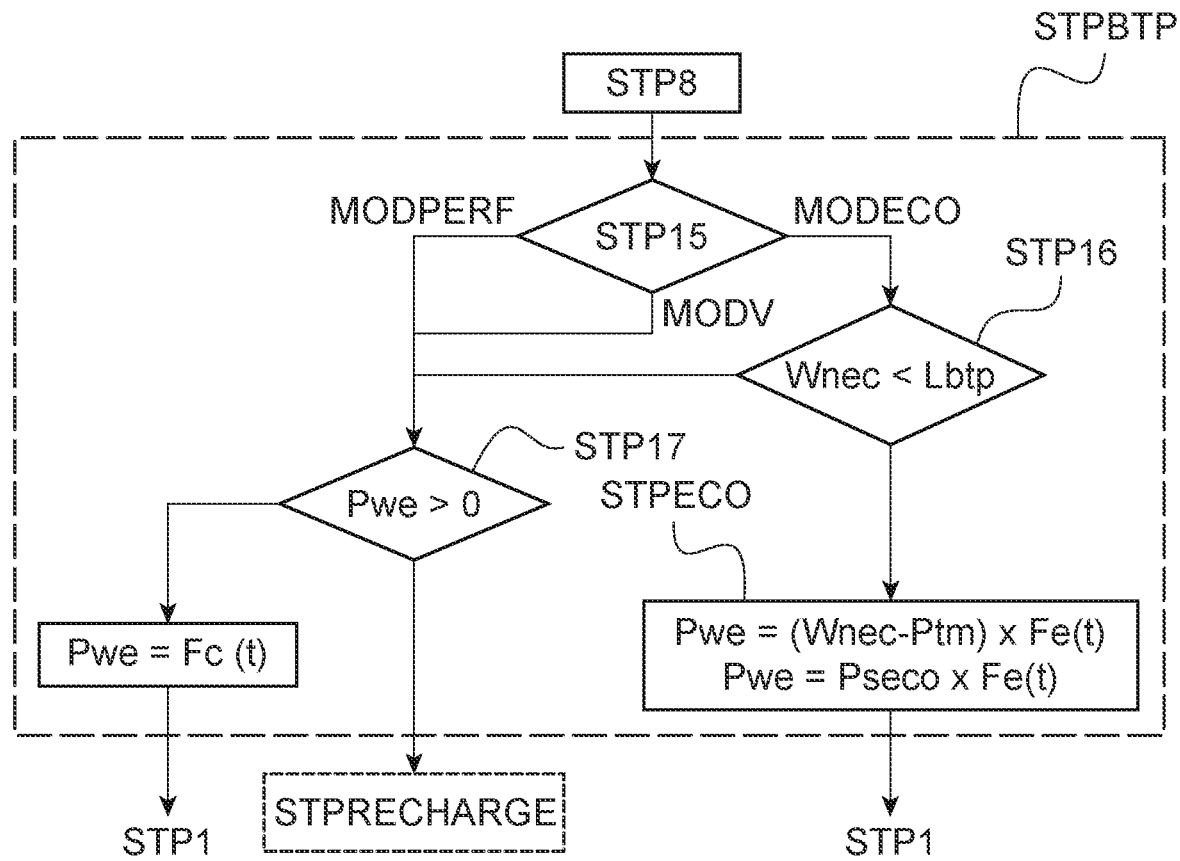
FIG. 5 is a diagram showing an example of a hybridization phase at low density altitude.

If the current density altitude Zt is less than or equal to the threshold density altitude Zs, the controller 25 applies a power transmission system limit phase STPBTP shown in FIG. 5. During a step STP15, the controller 25 determines the chosen operating mode depending on the signal transmitted by the selector 42.

If the chosen operating mode is the economy mode MODECO, the method comprises determining STP16, with the controller 25, whether the necessary power Wnec is less than or greater than or equal to the maximum limit power Lbtp. When the necessary power Wnec is less than the maximum limit power Lbtp, the controller 25 transmits a signal to at least one or indeed each electric machine 21 to implement the economy mode MODECO. If this is not the case, the controller 25 transmits a signal to at least one or indeed each electric machine 21 to implement the standby mode MODV. Optionally, the alerter emits an alert to inform the pilot of this.

If the standby mode MODV or the high-performance mode MODPERF is the chosen operating mode, the controller 25 transmits a signal to at least one or indeed each electric machine 21 to implement the standby mode MODV.

According to another aspect, the various transfer functions Fc(t), Fa1(t), Fa2(t), Fp(t), Fe(t), Fr(t) mentioned above may be in the form of a function F of the second order depending on the time t and three parameters, namely a static gain G, a damping coefficient A and a pulse w, i.e.:

$$F=G/(1+(2*A*t/w)+((t*t)/(w*w)))$$

where "/" represents the division sign, "*" represents the multiplication sign and "+" represents the addition sign.

These three parameters may vary from one function to another and may be determined by tests and/or simulations. Such a transfer function makes it possible to achieve the required operation in a progressive manner, in particular so as to bring the modification of the regulation of the one or more heat engines into parallel.

Naturally, the present invention is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present invention and the claims.

What is claimed is:

1. A method for controlling a thermal and electrical power plant for setting in motion at least one rotary member of a rotorcraft, the power plant comprising a thermal system and an electrical system for setting in motion a power transmission system connected to the at least one rotary member, the thermal system having at least one heat engine and the electrical system being provided with at least one electric machine, the electrical system having an electrical energy source electrically connected to the at least one electric machine, wherein the method comprises selecting, with a selector, an operating mode chosen from several operating modes, the method having a hybridization phase comprising the following steps:
comparing, with a controller, a current density altitude and a threshold density altitude; and
controlling, with the controller, the at least one electric machine, depending on the chosen operating mode as well as the step of comparing a current density altitude and a threshold density altitude and a necessary power to be supplied to the power transmission system;
wherein the rotary member comprises a rotary wing, the method comprising determining a failure of the thermal system rendering it inoperative, and determining a speed of rotation of the rotary wing, the method comprising commanding, with the controller, operation of the at least one electric machine in motor mode in the presence of the failure and the speed of rotation greater than zero; and
wherein the method comprises the following steps: comparing the speed of rotation with a stored autorotation speed, commanding, with the controller, the at least one electric machine to deliver a maximum auxiliary power in motor mode if the speed of rotation is less than the autorotation speed, commanding, with the controller, the at least one electric machine to deliver, in motor mode, a power less than the maximum auxiliary power if the speed of rotation is greater than or equal to the autorotation speed.

2. The method according to claim 1
wherein the several operating modes comprise a standby mode during which the at least one electric machine is stopped or in electric generator mode in order to recharge the electrical energy source during a recharging phase, an economy mode during which the at least one electric machine operates in motor mode and the thermal system delivers a reduced power, and a high-performance mode during which the at least one electric machine operates in motor mode and the thermal system delivers a maximum main power, and wherein the controller controls the at least one electric machine according to the standby mode when, concurrently, the chosen operating mode is the high-performance mode and the current density altitude is less than the threshold density altitude.

3. The method according to claim 1
wherein the method includes detecting a malfunction of the electrical system, the hybridization phase being prohibited when the malfunction is present.

4. The method according to claim 1
wherein the method comprises measuring an electrical capacity of the electrical energy source, the hybridization phase being prohibited if a measured electrical capacity is less than an electrical capacity threshold, the method comprising commanding, with the controller, a phase of recharging the electrical energy source by commanding operation of the electric machine in electric generator mode when the measured electrical capacity is less than or equal to the electrical capacity threshold.

5. The method according to claim 1
wherein the rotary member comprises a rotary wing, the method comprising measuring a speed of rotation of the rotary wing, the hybridization phase being prohibited by the controller if a measured speed of rotation does not lie within a reference rotational speed range.

6. The method according to claim 1
wherein the at least one heat engine is controlled by an engine computer, the engine computer comprising an automatic mode during which the engine computer controls a power delivered by the controlled heat engine in function of a speed of rotation of the at least one rotary member.

7. The method according to claim 6
wherein the method includes a step of determining the mode applied by the engine computer, the hybridization phase being authorized by the controller only when the engine computer is operating in the automatic mode.

8. The method according to claim 1
wherein, when the current density altitude is greater than the threshold density altitude and the chosen operating mode is an economy mode during which the at least one electric machine operates in motor mode and the thermal system delivers a reduced power, the method comprises:
determining, with the controller, whether the necessary power is less than or greater than or equal to the available power that can be produced by the thermal system;
applying, with the controller, the economy mode when the necessary power is less than the available power; and
applying, with the controller, a standby mode during which the at least one electric machine is stopped when the necessary power is greater than or equal to the available power.

9. The method according to claim 1
wherein, when an economy mode is chosen from the several operating modes, the method comprises commanding, with the controller, the at least one electric machine to supply, in motor mode, a power equal to the product of an economy transfer function and either an economy power or a difference between the necessary power and a predetermined reduced power.

10. The method according to claim 1
wherein, when a high-performance mode is chosen from the several operating modes, the method comprises commanding, with the controller, the at least one electric machine to supply, in motor mode, a power equal to the product of a high-performance transfer function and either a high-performance power or a difference between a predetermined maximum limit power that can be accepted by the power transmission system and the necessary power.

11. The method according to claim 1
wherein a recharging phase comprises the following steps:
determining whether a forward speed of the rotorcraft lies within a stored forward speed range;
determining whether an electrical capacity of the electrical energy source is less than a recharging threshold; and
as long as the forward speed of the rotorcraft lies within the forward speed range and the electrical capacity of the electrical energy source is less than the recharging threshold, recharging the electrical energy source by controlling, with the controller, the at least one electric machine in electric generator mode.

12. A rotorcraft provided with at least one rotary member, the rotorcraft comprising a thermal and electrical power plant for setting in motion the at least one rotary member, the power plant comprising a thermal system and an electrical system for setting in motion a power transmission system connected to the at least one rotary member, the thermal system having at least one heat engine and the electrical system being provided with at least one electric machine, the electrical system having an electrical energy source electrically connected to the at least one electric machine, wherein the rotorcraft comprises a selector for selecting an operating mode chosen from several operating modes, the rotorcraft comprising a controller connected to the selector as well as to a density altitude sensor and a sensor for sensing a necessary power to be supplied to the power transmission system, the controller being configured to control the at least one electric machine by applying the method according to claim 1.

13. A method for controlling a thermal and electrical power plant for setting in motion at least one rotary member of a rotorcraft, the power plant comprising a thermal system and an electrical system for setting in motion a power transmission system connected to the at least one rotary member, the thermal system having at least one heat engine and the electrical system being provided with at least one electric machine, the electrical system having an electrical energy source electrically connected to the at least one electric machine, wherein the method comprises selecting, with a selector, an operating mode chosen from several operating modes, the method having a hybridization phase comprising the following steps:

comparing, with a controller, a current density altitude and a threshold density altitude; and controlling, with the controller, the at least one electric machine, depending on the chosen operating mode as well as the step of comparing a current density altitude and a threshold density altitude and a necessary power to be supplied to the power transmission wherein, when the current density altitude is greater than the threshold density altitude and the chosen operating mode is a high-performance mode during which the at least one electric machine operates in motor mode and the thermal system delivers a maximum main power, the method comprises:

determining, with the controller, whether the necessary power lies within or outside a test range ranging from an available power that can be produced by the thermal system up to a maximum limit power that can be accepted by the power transmission system, the available power and the maximum limit power being excluded from the test range;

applying, with the controller, the high-performance mode when the necessary power lies within the test range; and applying, with the controller, a standby mode during which the at least one electric machine is stopped when the necessary power lies outside the test range.

14. The method according to claim 13 wherein the method includes detecting a malfunction of the electrical system, the hybridization phase being prohibited when the malfunction is present.

15. The method according to claim 13 wherein the method comprises measuring an electrical capacity of the electrical energy source, the hybridization phase being prohibited if a measured electrical capacity is less than an electrical capacity threshold, the method comprising commanding, with the controller, a phase of recharging the electrical energy source by commanding operation of the electric machine in electric generator mode when the measured electrical capacity is less than or equal to the electrical capacity threshold.

16. The method according to claim 13 wherein the rotary member comprises a rotary wing, the method comprising measuring a speed of rotation of the rotary wing, the hybridization phase being prohibited by the controller if a measured speed of rotation does not lie within a reference rotational speed range.

17. The method according to claim 13 wherein the at least one heat engine is controlled by an engine computer, the engine computer comprising an automatic mode during which the engine computer controls a power delivered by the controlled heat engine in function of a speed of rotation of the at least one rotary member, and wherein the method includes a step of determining the mode applied by the engine computer, the hybridization phase being authorized by the controller only when the engine computer is operating in the automatic mode.

18. A rotorcraft provided with at least one rotary member, the rotorcraft comprising a thermal and electrical power plant for setting in motion the at least one rotary member, the power plant comprising a thermal system and an electrical system for setting in motion a power transmission system connected to the at least one rotary member, the thermal system having at least one heat engine and the electrical system being provided with at least one electric machine, the electrical system having an electrical energy source electrically connected to the at least one electric machine, wherein the rotorcraft comprises a selector for selecting an operating mode chosen from several operating modes, the rotorcraft comprising a controller connected to the selector as well as to a density altitude sensor and a sensor for sensing a necessary power to be supplied to the power transmission system, the controller being configured to control the at least one electric machine by applying the method according to claim 13.

19. A method for controlling a thermal and electrical power plant for setting in motion at least one rotary member of a rotorcraft, the power plant comprising a thermal system and an electrical system for setting in motion a power transmission system connected to the at least one rotary member, the thermal system having at least one heat engine and the electrical system being provided with at least one electric machine, the electrical system having an electrical energy source electrically connected to the at least one electric machine, wherein the method comprises selecting, with a selector, an operating mode chosen from several operating modes, the method having a hybridization phase comprising the following steps:

comparing, with a controller, a current density altitude and a threshold density altitude; and controlling, with the controller, the at least one electric machine, depending on the chosen operating mode as well as the step of comparing a current density altitude and a threshold density altitude and a necessary power to be supplied to the power transmission wherein, when the current density altitude is less than or equal to the threshold density altitude and the chosen operating mode is an economy mode during which the at least one electric machine operates in motor mode and the thermal system delivers a reduced power, the method comprises:

determining, with the controller, whether the necessary power is less than or greater than or equal to a maximum limit power that can be accepted by the power transmission system;

applying, with the controller, the economy mode when the necessary power is less than the maximum limit power; and applying, with the controller, a standby mode during which the at least one electric machine is stopped when the necessary power is greater than or equal to the maximum limit power.

20. A rotorcraft provided with at least one rotary member, the rotorcraft comprising a thermal and electrical power plant for setting in motion the at least one rotary member, the power plant comprising a thermal system and an electrical system for setting in motion a power transmission system connected to the at least one rotary member, the thermal system having at least one heat engine and the electrical system being provided with at least one electric machine, the electrical system having an electrical energy source electrically connected to the at least one electric machine, wherein the rotorcraft comprises a selector for selecting an operating mode chosen from several operating modes, the rotorcraft comprising a controller connected to the selector as well as to a density altitude sensor and a sensor for sensing a necessary power to be supplied to the power transmission system, the controller being configured to control the at least one electric machine by applying the method according to claim 19.

* * * * *